United States Patent [19]
Bothra et al.

[11] Patent Number: 5,965,218
[45] Date of Patent: Oct. 12, 1999

[54] PROCESS FOR MANUFACTURING ULTRA-SHARP ATOMIC FORCE MICROSCOPE (AFM) AND SCANNING TUNNELING MICROSCOPE (STM) TIPS

[75] Inventors: Subhas Bothra; Ling Q. Qian, both of San Jose, Calif.

[73] Assignee: VLSI Technology, Inc., San Jose, Calif.

[21] Appl. No.: 08/819,283

[22] Filed: Mar. 18, 1997

[51] Int. Cl.$^6$ ............................... B05D 5/12; H05H 1/24; H01J 9/04

[52] U.S. Cl. ..................... 427/578; 427/579; 427/569; 427/77; 427/78; 445/50

[58] Field of Search ............................ 427/77, 78, 563, 427/562, 564, 574, 578, 579, 569, 570; 445/50

[56] References Cited

U.S. PATENT DOCUMENTS

| | | | |
|---|---|---|---|
| 4,906,840 | 3/1990 | Zdeblick et al. | 250/306 |
| 5,116,462 | 5/1992 | Bartha et al. | 156/643 |
| 5,127,990 | 7/1992 | Pribat et al. | 427/78 |
| 5,204,581 | 4/1993 | Andreadakis et al. | 313/336 |
| 5,272,913 | 12/1993 | Toda et al. | 250/306 |
| 5,279,865 | 1/1994 | Chebi et al. | 427/574 |
| 5,283,437 | 2/1994 | Greschnev et al. | 250/306 |
| 5,302,239 | 4/1994 | Roe et al. | 250/306 |
| 5,378,182 | 1/1995 | Liu | 445/50 |
| 5,378,658 | 1/1995 | Toyoda et al. | 427/78 |
| 5,391,259 | 2/1995 | Cathey et al. | 216/643 |
| 5,534,331 | 7/1996 | Shaw et al. | 427/563 |
| 5,540,958 | 7/1996 | Bothra et al. | 427/535 |
| 5,614,055 | 3/1997 | Fairbairn et al. | 427/574 |
| 5,746,634 | 5/1998 | Jankowski et al. | 427/78 |

OTHER PUBLICATIONS

Katherine Derbyshire, "Beyond AMLCDs: Field emission displays?", Solid State Technology, Nov. 1994, pp. 55–65.

Nalin Kumar, et al., "Diamond–based field emission flat panel displays", Solid State Technology, May 1995, pp. 71–74.

Peter Singer, "Flat Panel Processing Trends", Semiconductor International, Nov. 1995, p. 90.

*Primary Examiner*—Marianne Padgett
*Attorney, Agent, or Firm*—Gary S. Williams; Pennie & Edmonds LLP

[57] ABSTRACT

A method for manufacturing probe tips suitable for use in an atomic force microscope (AFM) or scanning tunneling microscope (STM) begins by depositing a layer of a first material over a substrate and then patterning the layer of the first material to define apertures wherever probe tips are to be formed. Next, a layer of a second material is deposited using an unbiased high density plasma chemical vapor deposition (HDPCVD) process to form sharp probe tips in the apertures in the layer of the first material. The HDPCVD process also forms a sacrificial layer of the second material on top of the portions of the first material not removed by the patterning step. The sacrificial layer at least partially overhangs the apertures in the first material, forming a shadow mask during the deposition process which gives rise to a sharp probe profile. After the formation of the probe tips, the remaining portion of the layer of first material is removed using a wet chemical etchant that selectively etches the first material at a much higher rate than the second material. The removing step also removes the sacrificial layer of the second material because the sacrificial layer is lifted off the substrate when the underlying layer of first material is etched away. In one preferred embodiment, the first material is silicon nitride and the second material is silicon dioxide.

8 Claims, 4 Drawing Sheets

PROCESS FOR MANUFACTURING ULTRA-SHARP ATOMIC FORCE MICROSCOPE (AFM) AND SCANNING TUNNELING MICROSCOPE (STM) TIPS

The present invention relates generally to the manufacture of probe tips for use in atomic force microscopes and scanning tunneling microscopes, and particularly to a manufacturing process that uses a lift-off layer for facilitating the manufacturing of ultra-sharp probe tips.

BACKGROUND OF THE INVENTION

An atomic force microscope (AFM) scans over the surface of a sample. Typically, in the "contacting mode" of operation, a sharp tip is mounted on the end of a cantilever and the tip rides on the surface of a sample with an extremely light tracking force, on the order of $10^{-5}$ to $10^{-10}$ N. Profiles of the surface topography are obtained with extremely high resolution. Images showing the position of individual atoms are routinely obtained. In a second mode of operation, the tip is held a short distance, on the order of 5 to 500 Angstroms, from the surface of a sample and is deflected by various forces between the sample and the tip; such forces include electrostatic, magnetic, and van der Waals forces.

Atomic force microscopy is capable of imaging conductive as well as insulating surfaces with atomic resolution. Typical AFM's have a sensitivity of 0.1 Angstrom in the measurement of displacement, and a spring constant of about 1 Newton per meter (1 N/m). Further, the cantilever must be mounted so that the cantilever can approach and contact a sample.

Several methods of detecting the deflection of the cantilever are available which have sub-angstrom sensitivity, including vacuum tunneling, optical interferometry, optical beam deflection, capacitive and resistive techniques. One such technique is described in PCT Patent Document WO 9212398, "Piezoresistive Cantilever For Atomic Force Microscopy", published Jul. 23, 1992 (PCT Application No. 91US9759), which is incorporated herein by reference.

Scanning tunneling microscopes (STMs) are similar to AFMs, except that surface imaging is performed by detecting conductive properties of the surface being scanned.

While AFM/STM probe tips have been manufactured using semiconductor processing techniques in the past, the tips produced by those methods have tended to have a tip radius of at least 1000 angstroms, which is blunter than optimal.

It is an object of the present invention to provide a process for producing ultra-sharp AFM/STM probe tips.

SUMMARY OF THE INVENTION

The present invention provides a method for manufacturing probe tips suitable for use in an atomic force microscope (AFM) or scanning tunneling microscope (STM). The probe manufacturing process begins by depositing a layer of a first material over a substrate and then patterning the layer of the first material to define apertures wherever probe tips are to be formed. Next, a layer of a second material is deposited using an unbiased high density plasma chemical vapor deposition (HDPCVD) process to form sharp probe tips in the apertures in the first material. The HDPCVD process also forms a sacrificial layer of the second material on top of the portions of the first material not removed by the patterning step. The sacrificial layer at least partially overhangs the apertures in the first material, forming a shadow mask during the deposition process which gives rise to a sharp probe profile.

After the formation of the probe tips, the remaining portion of the layer of the first material is removed using a wet chemical etchant that selectively etches the first material at a much higher rate than the second material. The removing step also removes the sacrificial layer of the second material because the sacrificial layer is lifted off the substrate when the underlying layer of first material is etched away. In one preferred embodiment, the first material is silicon nitride and the second material is silicon dioxide.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Since the present invention concerns atomic force microscopy (AFM) as well as scanning tunneling microscopy (STM) a short description of the physical apparatus used in AFM and STM is provided for those not familiar with this prior art.

Figure 1:
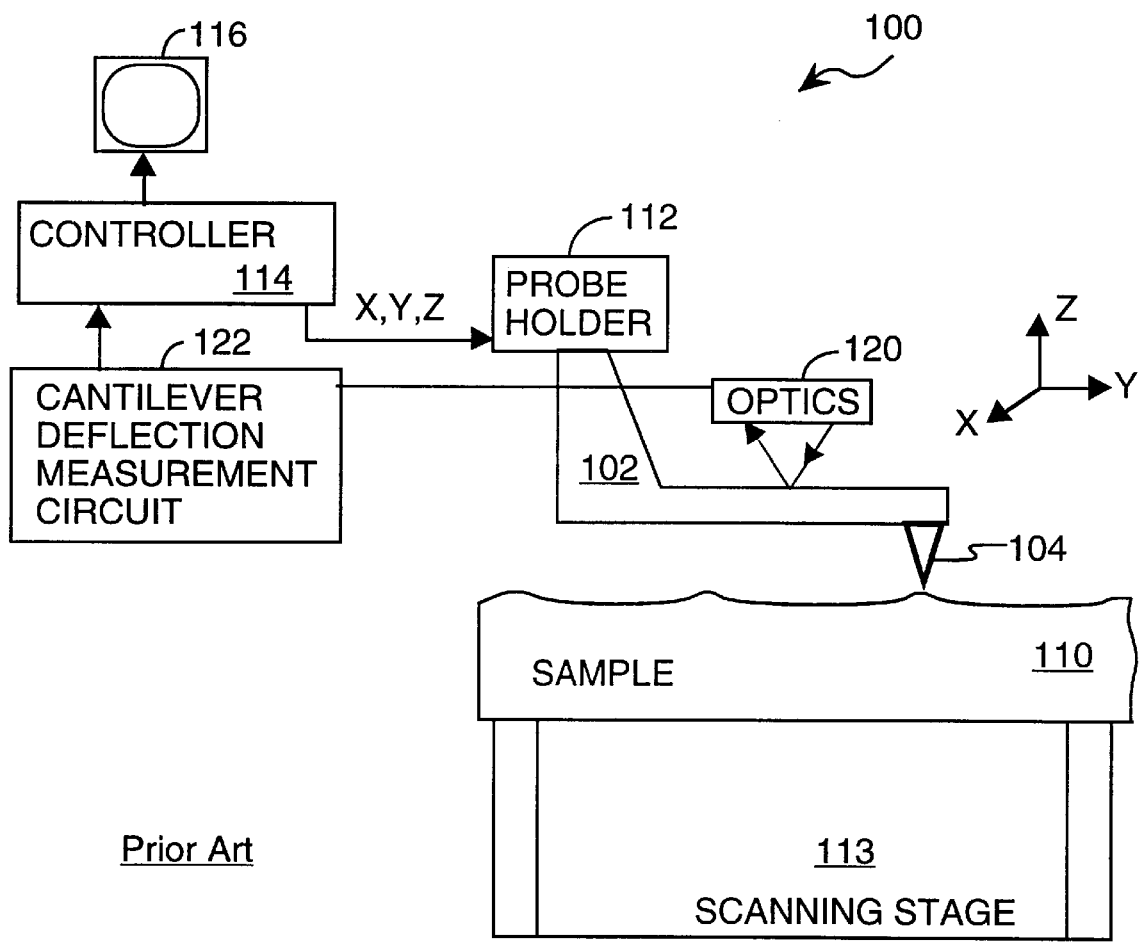
FIG. 1 is a block diagram of an atomic force microscope.

Referring to FIG. 1, there is shown a conceptual diagram of an atomic force microscope 100. A microminiature cantilever arm 102 with a sharp tip 104 at its free end is used to probe the surface of a sample 110. In some preferred embodiments the tip 104 is simply the apex of the cantilever 102 and does not project out from the cantilever.

In the preferred embodiments, the sample 110 is mounted on an XYZ scanning stage 113. This is a "piezo scanning tube" type of stage, which uses piezoelectric actuators to precisely move the sample 110 in the X, Y and Z directions. The cantilever 102 is kept stationary while an XYZ scanning stage 113 moves the sample 110 so as to scan the sample's surface. Those ordinarily skilled in the art will recognize that a separate Z translator apparatus for moving the probe 102 up and down relative to the sample 110 may also be utilized in lieu of a three axis scanning stage 113. Alternately, the sample's surface can be scanned using a probe holder 112 that functions as an XYZ scanner to move the cantilever 102 while keeping the sample 110 stationary.

Regardless of whether the sample holder 113 of the probe holder 112 or both are used to move the probe relative to the surface of the sample, scanning is controlled by a programmed microcontroller or computer 114, which also analyzes measurement data and displays measurement information on display 116.

The AFM has a "contacting mode" of operation and a "non-contacting mode" of operation. In the "contacting mode" of operation, the tip 104 rides on the surface of a sample with an extremely light tracking force, on the order of $10^{-5}$ to $10^{-10}$ N. Profiles of the surface topography are obtained with extremely high resolution. Images showing the position of individual atoms are routinely obtained. In the second non-contacting mode of operation, the tip 104 is held a short distance, on the order of 5 to 500 Angstroms, from the surface of a sample and is deflected by various forces between the sample and the tip; such forces include electrostatic, magnetic, and van der Waals forces. In either mode of operation, measurements of the sample's surface topography or other characteristics are obtained by measuring deflection of the cantilever 102. Deflection of the cantilever is usually measured using precisely aligned optical components 120 coupled to a deflection measurement circuit 122, although other techniques are sometimes used.

Atomic force microscopy is capable of imaging conductive as well as insulating surfaces with atomic resolution. Typical AFM's have a sensitivity of 0.1 Angstrom in the measurement of displacement.

Prior Art Fabrication Process

Figure 2A:
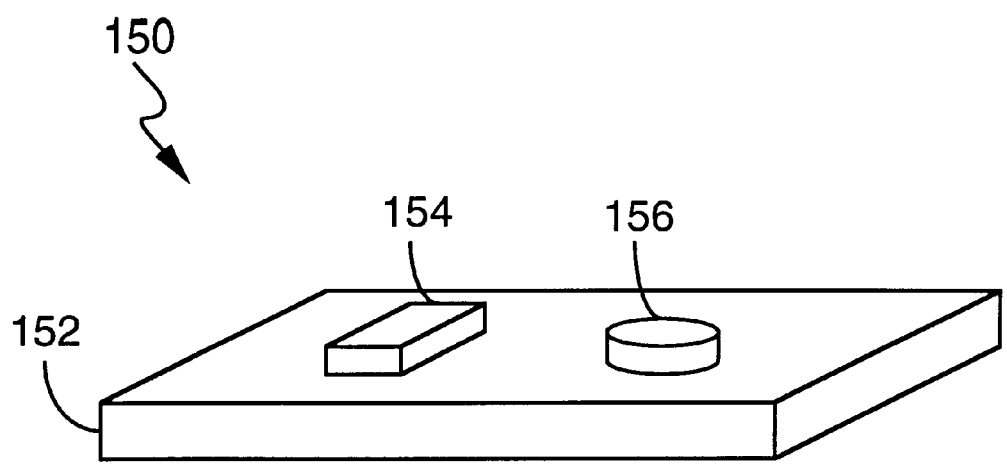
FIGS. 2A and 2B depict a prior art probe tip manufacturing process.

Referring to FIG. 2A, a wafer 150 is shown at an intermediate stage of fabrication of a prior art AFM/STM probe tip fabrication process. At this stage, a substrate 152 is covered with a first material layer such as a metal layer which has been patterned and etched away leaving structural protrusions 154 and 156. Alternately, the first material layer can be a polysilicon layer or silicon oxide layer. The deposition of the first material layer can be accomplished by any technique known in the art, such as chemical vapor deposition (CVD), plasma enhanced CVD (PECVD), sputtering, or electron cyclotron resonance (ECR). And, the etching step can be performed using any technique known in the art, such as dry etching or wet etching.

Once the protrusions 154, 156 are formed, an AFM probe tip is ready to be grown atop each of the protrusions. An ECR process is used to deposit a second material layer atop the protrusions 154, 156. ECR is a process known in the art for having precise deposition characteristics. For example, see Chebi et al, U.S. Pat. No. 5,279,865 for a detailed explanation of an ECR process. The ECR deposition process also includes a sputter-etching component which slopes the second material layer atop the protrusions. The result is a planar layer 158, which is conformal to the exposed substrate 152, and AFM probe tips 20, 22, which have precisely angled surfaces.

Figure 2B:
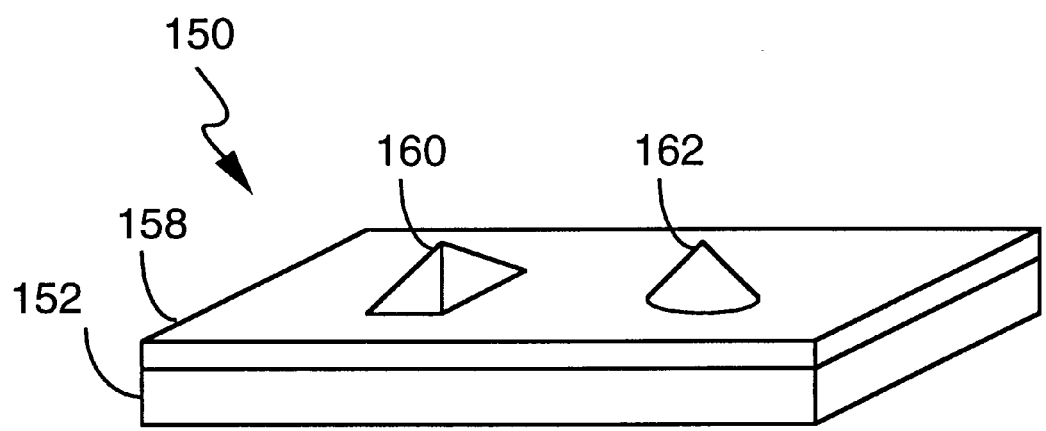
Figure 3:
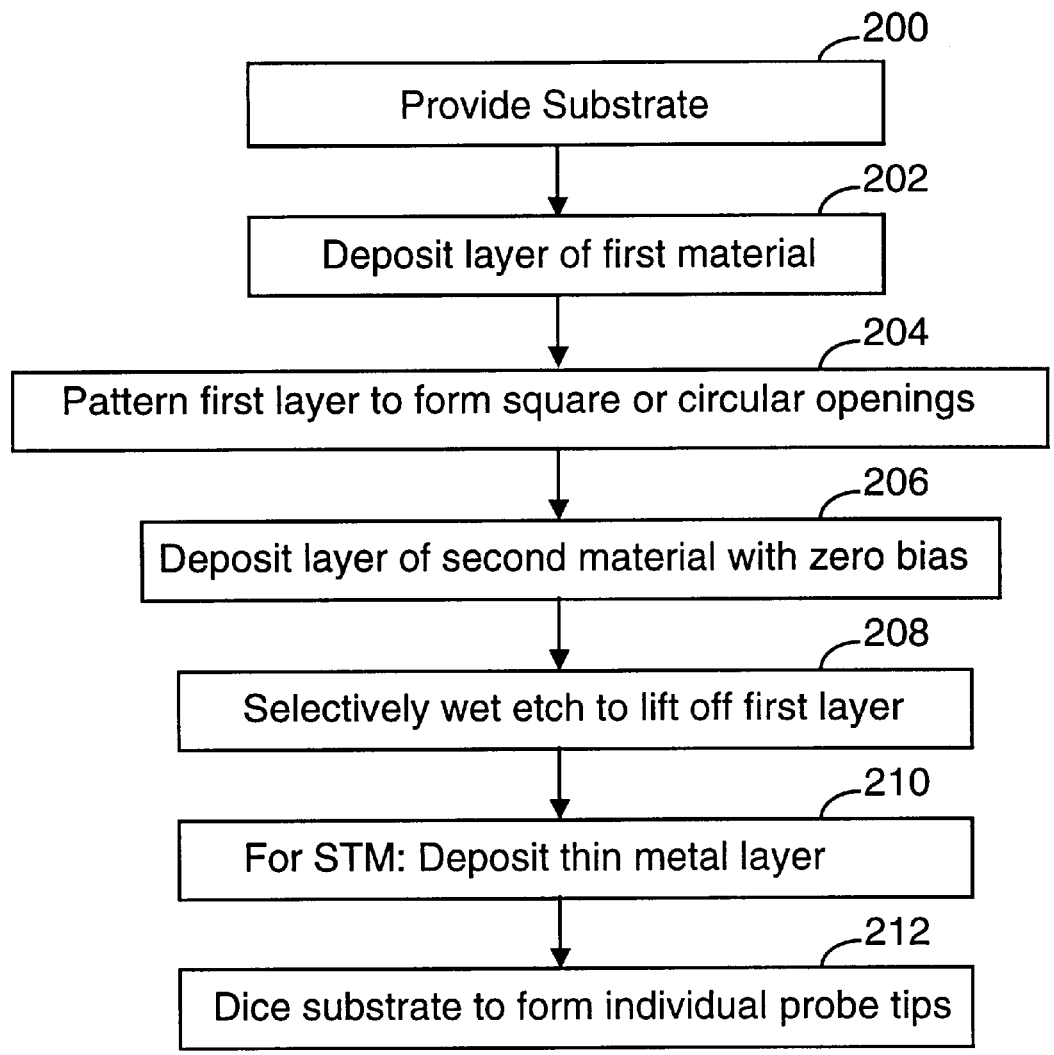
FIG. 3 depicts a flow chart of a preferred embodiment of the probe tip manufacturing process.

As shown in FIG. 2B, the probe tip geometry is dependent on the shape of the protrusion. Probe tip 160 is pyramidal because the protrusion 154 is rectangular, and probe tip 162 is conical because the protrusion 156 is circular. For further information about this prior art fabrication technique, see U.S. Pat. No. 5,540,958.

In some prior art probe tip manufacturing processes, electron beam assisted chemical vapor deposition and focused ion beam milling has been used to form probe tips with a tip radius of less than 1000 anstroms.

Preferred AFM/STM Tip Fabrication Process

Referring to FIGS. 3 and 4A–4E, a preferred embodiment of the sharp AFM/STM probe tip fabrication process of the present invention is as follows. The process begins by providing (step 200) a substrate 230. The substrate 230 may be formed from silicon or other semiconductor material, a dielectric material, or a semiconductor material covered by a dielectric material.

A layer 232 of a first material is deposited or grown on the substrate 230 (step 202). Depending on the desired tip material, the first material may be silicon nitride (SiN), silicon dioxide ($SiO_2$), polysilicon, or any of a variety of other materials used in semiconductor manufacturing processes. More generally, the first material must be selectively etchable using a wet etchant that is highly selective with respect to the material to be used to form probe tips. The layer 232 of first material is then patterned (i.e., masked and etched) to form apertures 234 in the layer of first material wherever probe tips are to be formed (step 204). The apertures 234 formed may be between 2 and 10 micrometers in diameter, and are preferably about 5 micrometers in diameter.

Figure 4E:
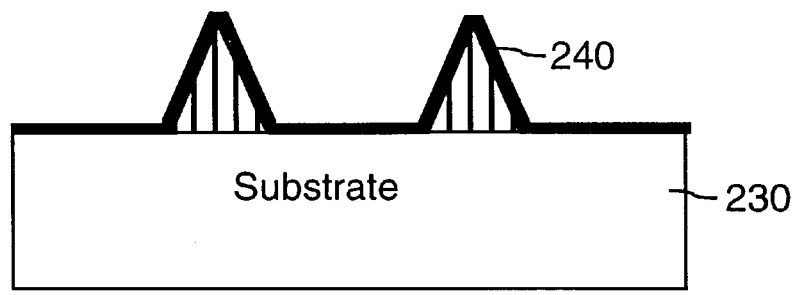
FIGS. 4A, 4B, 4C, 4D, and depict a sequence of cross sections of a semiconductor substrate and overlying layers during the manufacturing of a probe tip.
Figure 4A:
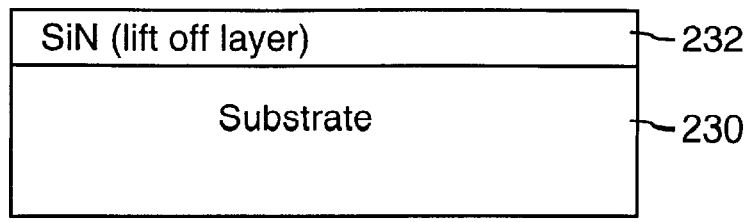
Figure 4B:
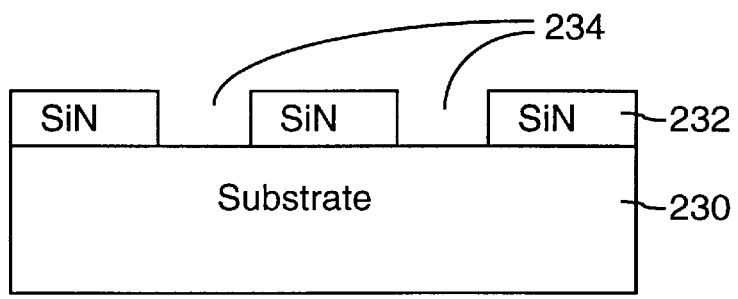
Figure 4C:
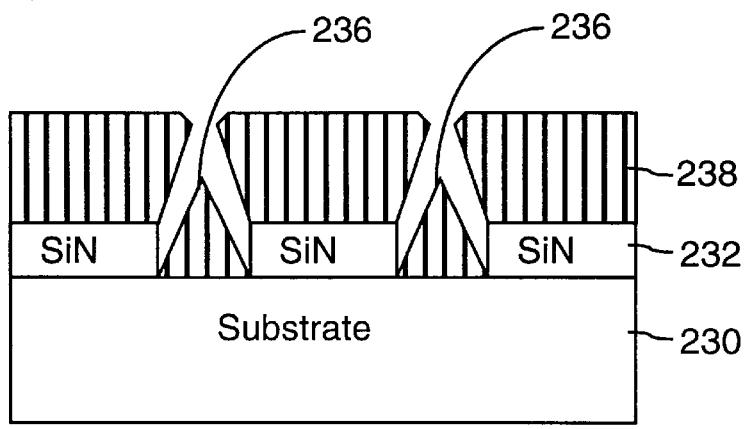
Figure 4D:
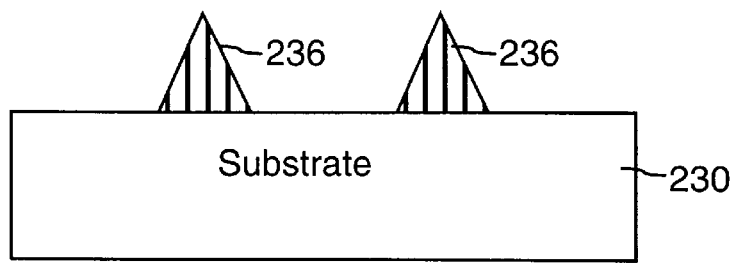

Next, a layer of a second material is deposited using an unbiased high density plasma chemical vapor deposition (HDPCVD) process to form sharp probe tips 236 in the apertures in the first material (step 206). The HDPCVD process also forms a sacrificial layer 238 of the second material on top of the portions of the first material not removed by the patterning step. The sacrificial layer 238 is actually a set of islands of the second material. The islands 238 at least partially overhang the apertures 234 in the first material, forming a shadow mask during the deposition process which gives rise to a sharp probe profile. As can be seen In FIG. 4C, as the sacrificial layer 236 grows, it increasingly covers the apertures 234. This has the beneficial effect of narrowing the window for depositing the second material, which helps to form very sharp probe tips.

The plasma chemical vapor deposition of the second material is preferably unbiased, meaning that an RF electric field is not applied to the electrostatic chuck (not shown) supporting the substrate being processed, and thus that a biased RF electrical field is not used to cause ions in the plasma chamber to bombard the substrate. By using an unbiased HDPCVD process, the fill capacity of the deposited material is reduced, meaning that HDPCVD process is intentionally tuned so as to not completely fill the apertures. This is the opposite of the goal of normal PECVD (plasma enhanced chemical vapor deposition) techniques that are used to completely fill narrow gaps and apertures in semiconductor circuit manufacturing.

The HDPCVD process can be performed in a number of commercially available plasma chemical vapor deposition systems, including the DSM 9900 and the EPIC manufactured by LAM Research, the Ultima HDPCVD Centura manufactured by Applied Materials, and the Speedie manufactured by Novellus Systems. Using the EPIC, the gap fill process conditions for standard silicon oxide deposition are as follows: microwave power 1400 W, RF power 1400 W, pressure 5 mTorr, silane flow 80 sccm, oxygen flow 160 sccm and argon flow 100 sccm. Under these conditions the gross deposition rate is 7000 Angstroms per minute and the gross sputter etch rate is 2000 Angstroms per minute, resulting in a net deposition rate of 5000 Angstroms per minute. For the formation of the oxide tip, the RF power was reduced to 0 W, resulting in a net deposition rate of 7000 Angstroms per minute.

After the formation of the probe tips, the remaining portion of the layer 232 of the first material is removed using a wet chemical etchant that selectively etches the first material at a much higher rate than the second material (step 208). The removing step also removes the sacrificial layer 238 of the second material because the sacrificial layer is lifted off the substrate when the underlying layer 232 of first material is etched away. For this reason the layer of first material may be called a "lift off" layer.

If the probe tips being manufactured are to be used in an STM, the surface of the probe tips must be highly conductive. Therefore, for such tips, a thin layer 240 of metal or other very low resistance material is deposited on top of the probe tips and substrate (step 210). The layer 240 is preferably 50 to 200 Angstroms thick when the deposited metal is Molybdenum.

Finally, the substrate is scribed and diced so as to form a large number of individual probe tips (212). Typically, a large wafer with many tips will be manufactured. The tips may be distributed over the wafer substrate so as to enable the wafer to be scribed and diced so as to form cantilevers with probe tips on their ends that are suitable for use in an AFM or STM.

In one preferred embodiment, the first material is silicon nitride and the second material is silicon dioxide. In this embodiment, the wet etchant used is preferably phosphoric acid.

In another preferred embodiment, the first material is polysilicon and the second material is selected from the set consisting of silicon nitride and silicon oxide. In this embodiment, the wet etchant used is preferably KOH (potassium hydroxide).

In another preferred embodiment, the first material is selected from the set consisting of silicon nitride and silicon dioxide and the second material is polysilicon. If the first material is silicon dioxide the wet etchant used is preferably hydrofluoric acid or buffered oxide etch, and if the first material is silicon nitride the wet etchant used is preferably hot phosphoric acid.

Using the present invention, the inventors have formed probe tips having a tip radius of less than 1000 Angstroms. More specifically, tips having a tip radius of about 100 Angstroms have been formed.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of manufacturing microscope probe tips comprising steps of:

depositing a single, first material over a substrate to form a layer of the first material;

patterning the layer of the single, first material to define apertures in the layer of the first material wherever probe tips are to be formed;

depositing a second material over the first material using a plasma chemical vapor deposition (PCVD) process, in which no electric field bias is used to cause ions to bombard the substrate, to form probe tips in the apertures in the first material, the PCVD process further forming a sacrificial layer of the second material on top of the portions of the first material not removed by the patterning step, the sacrificial layer at least partially overhanging the apertures in the layer of the first material;

removing remaining portions of the layer of the first material using a wet chemical etchant that selectively etches the first material at a higher rate than the second material, the removing step further removing the sacrificial layer of the second material by removing the portions of the layer of the first material on which the sacrificial layer of second material was formed, wherein the removing step does not remove the probe tips; and one or more final processing steps, after the removing step, to complete manufacturing of the probe tips.

2. The method of claim 1, wherein the first material is silicon nitride and the second material is silicon oxide.

3. The method of claim 1, wherein the first material is polysilicon and the second material is selected from the set consisting of silicon nitride and silicon oxide.

4. The method of claim 1, wherein the first material is selected from the set consisting of silicon nitride and silicon oxide and the second material is polysilicon.

5. The method of claim 1, wherein the removing step is followed by a step of depositing a metal film over the probe tips to form probe tips suitable for use in a scanning tunneling microscope.

6. The method of claim 1, wherein the removing step is followed by a step of depositing a conductive film material over the probe tips.

7. The method of claim 1, wherein the removing step is followed by a step of dicing the substrate to form separate probe tips.

8. The method of claim 1, wherein the probe tips have a tip radius of less than 1000 angstroms.

* * * * *